(12) United States Patent  
Senghaas et al.

(10) Patent No.: US 7,584,656 B2  
(45) Date of Patent: Sep. 8, 2009

(54) FLOATLESS RAIN GAUGE

(75) Inventors: Karl A. Senghaas, San Antonio, TX (US); Peter Senghaas, San Antonio, TX (US); Michel E. Senghaas, San Antonio, TX (US); Colin M. Sanderson, San Antonio, TX (US)

(73) Assignee: Electrolab, Inc., San Antonio, TX (US)

( * ) Notice: Subject to any disclaimer, the term of this patent is extended or adjusted under 35 U.S.C. 154(b) by 0 days.

(21) Appl. No.: 11/900,489

(22) Filed: Sep. 12, 2007

(65) Prior Publication Data

US 2009/0064776 A1   Mar. 12, 2009

(51) Int. Cl.  
*G01W 1/00* (2006.01)

(52) U.S. Cl. ............. 73/170.21; 73/170.17; 73/304 R

(58) Field of Classification Search .. 73/170.16–170.28  
See application file for complete search history.

(56) References Cited

U.S. PATENT DOCUMENTS

| | | | | | |
|---|---|---|---|---|---|
| 4,031,753 | A | * | 6/1977 | Hooper | 73/170.16 |
| 4,153,881 | A | * | 5/1979 | Permut et al. | 375/242 |
| 4,188,826 | A | * | 2/1980 | Kankura et al. | 73/304 R |
| 4,196,625 | A | * | 4/1980 | Kern | 73/304 R |
| 4,203,325 | A | * | 5/1980 | Cowles et al. | 73/304 R |
| 4,646,569 | A | * | 3/1987 | Cosser | 73/304 R |
| 5,125,268 | A | * | 6/1992 | Caron | 73/170.17 |
| 5,501,102 | A | * | 3/1996 | Williamson | 73/304 R |
| 5,519,639 | A | * | 5/1996 | Jordan et al. | 702/55 |
| 5,603,238 | A | * | 2/1997 | Williamson | 73/304 R |
| 5,627,523 | A | * | 5/1997 | Besprozvanny et al. | 340/623 |
| 5,829,303 | A | * | 11/1998 | Fraser | 73/319 |
| 5,943,908 | A | * | 8/1999 | Innes et al. | 73/290 R |
| 6,250,152 | B1 | * | 6/2001 | Klein et al. | 73/304 C |
| 6,334,360 | B1 | * | 1/2002 | Chen | 73/304 R |
| 6,640,649 | B1 | * | 11/2003 | Paz et al. | 73/861.41 |
| 6,810,732 | B2 | * | 11/2004 | Shon | 73/304 R |
| 7,222,528 | B2 | * | 5/2007 | Stahlmann et al. | 73/304 R |
| 7,487,677 | B2 | * | 2/2009 | Chai et al. | 73/304 R |

OTHER PUBLICATIONS

PCT International Search Report and Written Opinion for PCT Application No. PCT/US08/10614.

* cited by examiner

*Primary Examiner*—Lisa M Caputo  
*Assistant Examiner*—Jermaine Jenkins  
(74) *Attorney, Agent, or Firm*—Jackson Walker LLP; William B. Nash

(57) ABSTRACT

A rain gauge device is provided that uses a plurality of conductivity sensors to determine liquid levels. Certain rain gauge devices include a plurality of conductivity sensors fixed along the length of a support member, wherein each conductivity sensor comprises at least two selectable electrodes for sensing the presence of a liquid by measuring a conductivity of the liquid between these electrodes when a liquid is present between the sensing electrodes, and an electronic command unit adapted to apply a voltage between a common electrode and a selected electrode. Level measuring devices are also provided that comprise a collector, a measuring tube, a plurality of conductivity sensors and an electronic command unit for applying a voltage across the conductivity sensors and for converting the conductivity measured into a digital output for each increment. Methods of use and operation are also provided.

15 Claims, 6 Drawing Sheets

FIG. 1 LEVEL MEASURING DEVICE 100

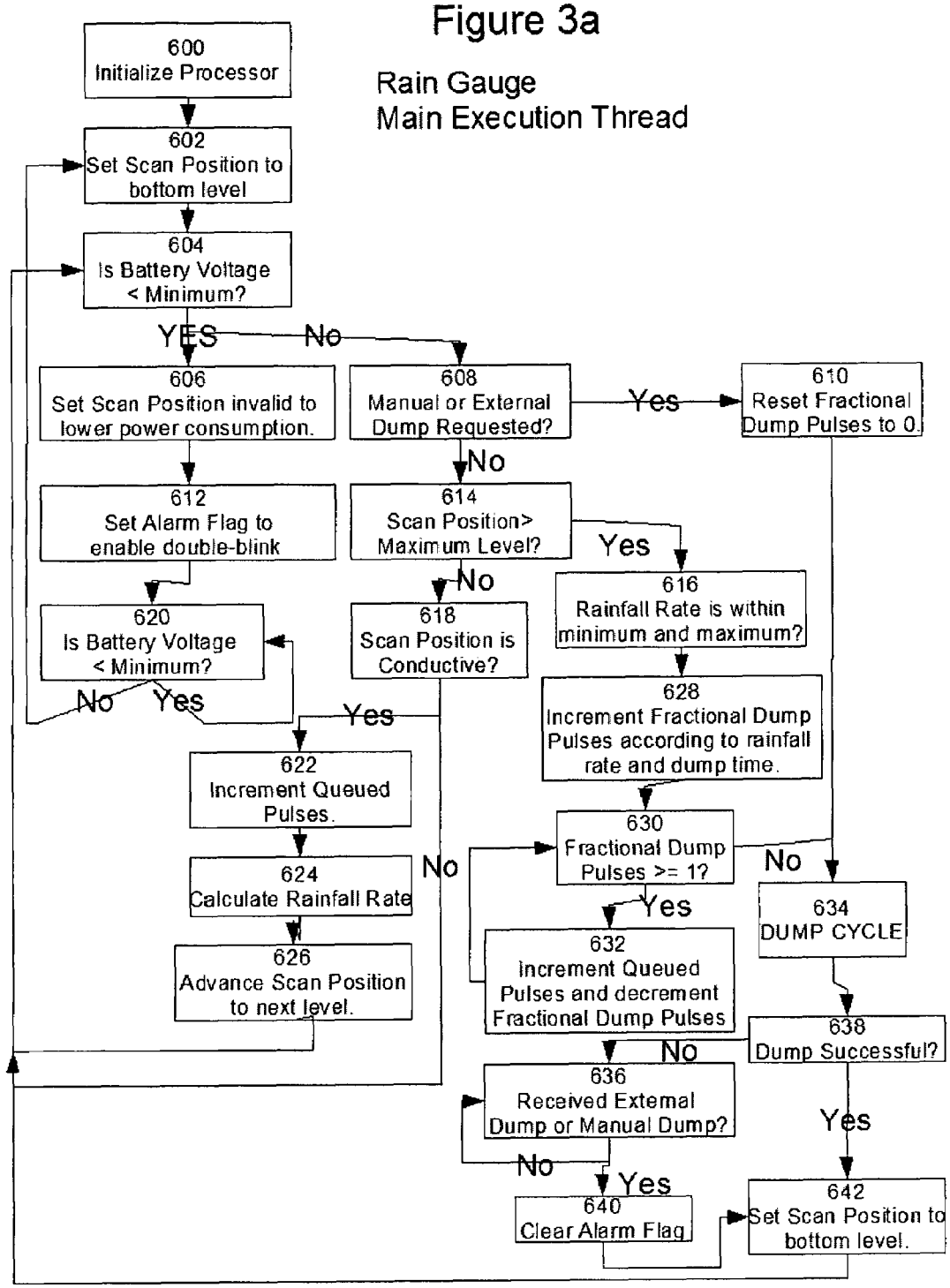

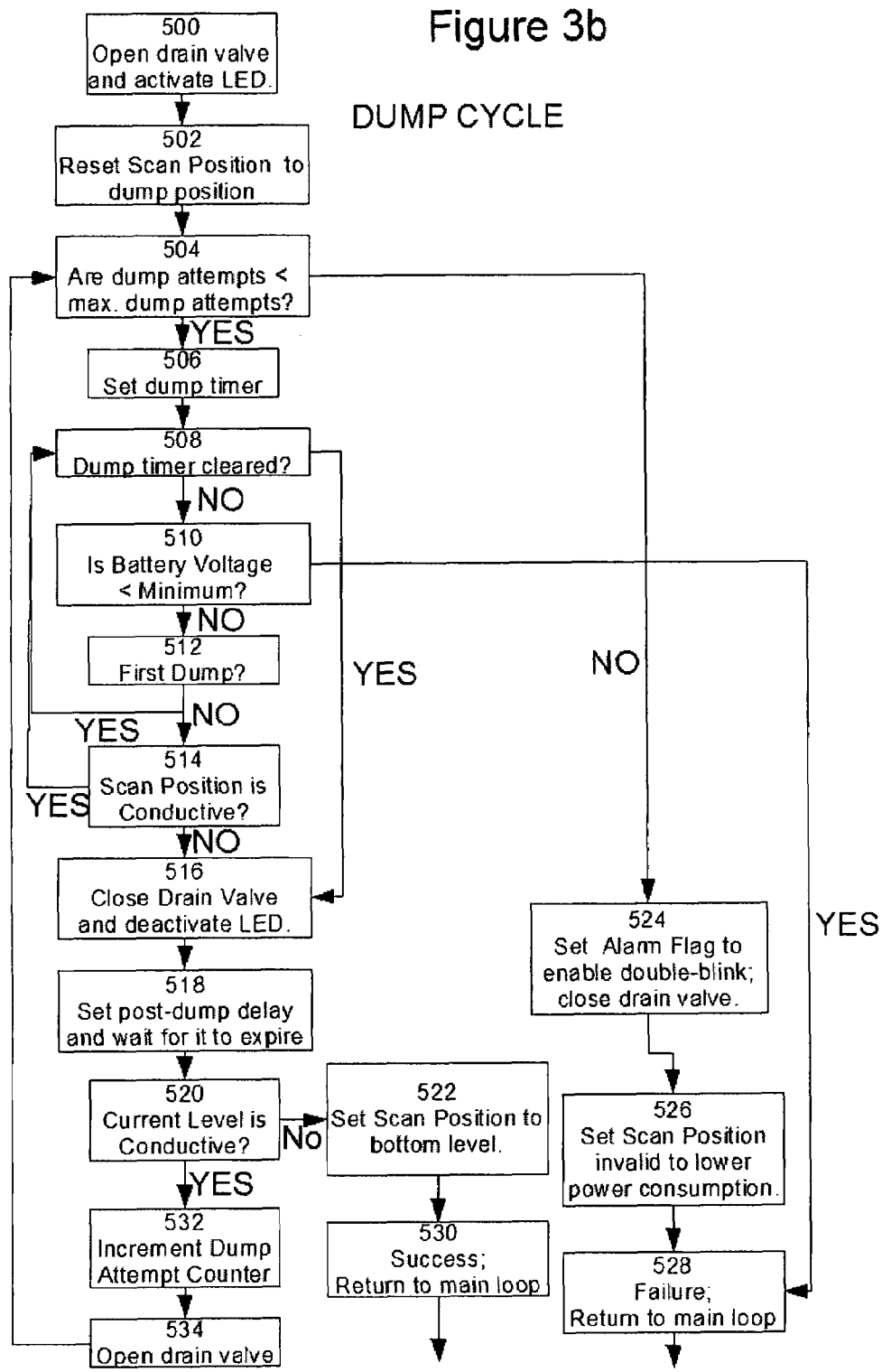

FLOATLESS RAIN GAUGE

FIELD OF THE INVENTION

The present invention generally relates to level measurement devices for liquids and more particularly, to level measurement devices that sense liquid levels by detecting the rail to rail voltage between a queried level sensing electrode and a reference electrode. Accordingly, the reference electrode is either "on" or "off" depending upon whether a liquid is present at a queried level electrode.

BACKGROUND OF THE INVENTION

Many devices have been proposed for measurement of rain. One of the most primitive means for measuring rain is placing a tube marked with measurement increments in an outdoor area exposed to the rain. Other means include the use of sight glasses, magnetic and mechanical float level sensors (including magnetostrictive, resistive chain level sensors), pneumatic level sensors (nitrogen bubblers), microwave/radar level sensors, optical level sensors, ultrasonic or sonar level sensors, hydrostatic pressure sensors.

The tipping bucket rain gauge is another alternative to the standard rain gauge for measuring rainfall. Two specially designed buckets tip when the weight of 0.01 inches of rain falls into them. When one bucket tips, the other bucket quickly moves into place to catch the rain. Each time a bucket tips, an electronic signal is sent to a recorder. To calculate the rainfall for a certain time period, the number of marks on the recorder is multiplied by 0.01 inches. The tipping bucket rain gauge is especially good at measuring drizzle and very light rain events. If the recorder is equipped with a clock, you can determine how much rain fell during certain time periods without actually being present at the station. However, one weakness of the tipping bucket rain gauge is that it often underestimates rainfall during very heavy rain events, such as thunderstorms.

Unfortunately, the prior art conventional rain gauge devices suffered from a variety of disadvantages. Many devices suffered from low reliability, low accuracy, excessive maintenance and/or recalibration requirements, low repeatability or precision, high cost, and high failure rate mainly because the conventional rain gauge device utilized moving parts, which increased the occurrence rate of failures attributable to such parts. And, many of these conventional rain gauge devices do depend, in some fashion, upon the physical properties of the fluid such as density and temperature, and thus require recalibration and/or reconfiguration of the rain gauges in different conditions.

Additionally, the prior art level rain gauge devices are not suited for precisely measuring rainfall accumulation over time and are not well adapted to providing necessary warnings of impending floods. This is a major draw back in the prior art. Increasing urban development, subsidence of land due to consumption of ground water, and increasing severity of weather conditions are increasing the frequency and severity of flooding in many areas. The National Oceanic & Atmospheric Administration (NOAA) estimates around 5,321 flash flood deaths in the United States between from 1960 to 2006. NOAA warns that flash floods and floods are the number one weather-related killer, with around 140 deaths recorded in the United States each year. Floods on average are also responsible for $4.6 billion in damages in the each year in the United States alone.

Given the gravity of flooding problems in the United States and abroad, a need exists for accurate and reliable measurement devices capable of measuring an accumulation of rainfall that are able to warn surrounding residents and weather stations of flood conditions and thereby allow for sufficient time to evacuate low-lying areas. Accordingly, it would be desirable to have rain gauge devices that rely less on moving parts, and the density properties of fluids in order to obtain an accurate measurement heading. Importantly, a gauge that provides a simple "on" "off" signal at a measurement increment is needed. Accurate measurements of rainfall also can be used to check alternate rainfall measurements such as radar, and calibrate them, in order to predict aquifer usage for crop watering, and predict water supply shortfalls. On a small scale, a homeowner could better judge how often to water his land, noting that areas served by radio or television stations are large and their coverage area varies greatly not only in the amount of rain measured but in whether there was rain.

SUMMARY OF THE INVENTION

The rain gauge according to the invention uses and electric potential supplied to a common electrode to count the number of level increments in a measurement tube. When the measurement tube is full, the gauge empties the measurement tube, and begins the count at the bottom again.

More particularly, when battery power is applied to the circuitry of the rain gauge according to the invention, a DC to AC circuit generates a current limited power for a common electrode.

The 5 volt power supply also powers a microcontroller and other circuitry. The microcontroller drives an optical switch to close periodically as an indication of correct function, and a lamp flashes at the same time the optical switch is closed, indicating the same thing to an attending service person. The microcontroller selects detection points, i.e., electrodes to "poll", one at a time, starting with the bottom of the tube until the selection is above the water line. At each selection the current detector informs the current detector informs the microcontroller that current is present, which drives a reed relay to output one switch closure, and advance to the next selection. When the "N"th switch detects water, in addition to driving the reed relay, the solid state switch turns a custom solenoid to quickly empty the tube. Note that the detection electrodes alternate left and right of the common electrode instead of a single row. In this way the electrodes are twice as far apart so that a drop of water hanging between electrodes doesn't falsely advance the selection. An on board button or an off board switch closure will also turn on the dump solenoid, usually to begin from scratch once each day.

Advantages of the rain gauge devices of the present invention include, but are not limited to, high reliability, accuracy, high repeatability, low cost, and low failure rate. Additionally, the lack of moving parts in certain embodiments reduces the failures that would be attributable to such parts such as wear out, or the sticking of a magnetic float. Furthermore, because rain gauge devices of the present invention do not depend upon the physical properties of the fluid such as density and temperature, recalibration and/or reconfiguration of the rain gauge devices of the present invention are not needed. Also, the signal output is a rail to rail voltage

BRIEF DESCRIPTION OF THE DRAWINGS

A more complete understanding of the present disclosure and advantages thereof may be acquired by referring to the following description taken in conjunction with the accompanying figures, wherein:

FIGS. 3A and 3b are flow diagrams for the operation of the rain gauge device according to the first embodiment of the invention.

Figure 1:
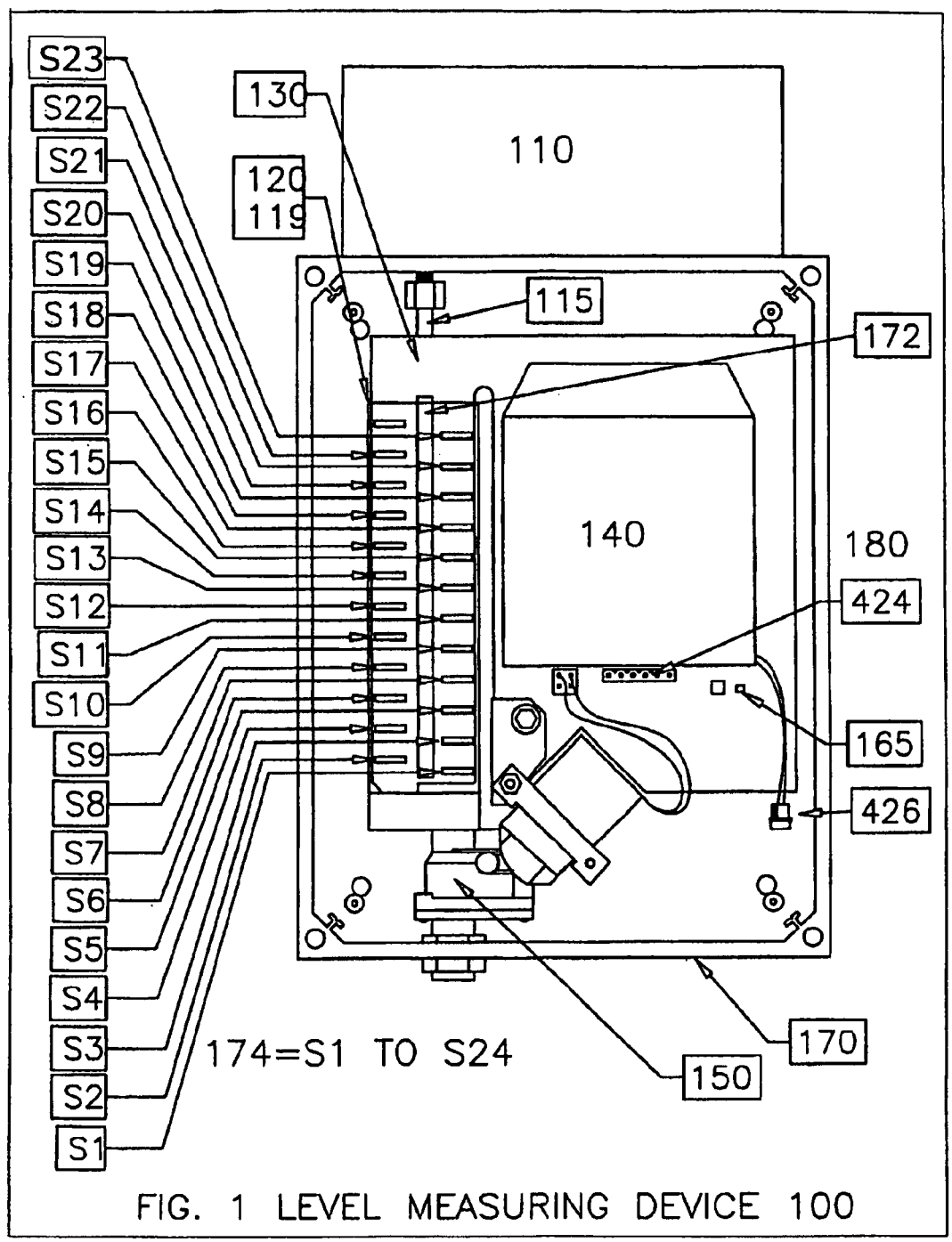
FIG. 1 is a drawing of an exemplary rain gauge device according to first embodiment of the invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention generally relates to rain gauge devices for liquids and more particularly, to rain gauge devices utilizing conductivity sensing electrodes and methods thereof. FIG. 1 is a drawing of a level measuring device according to an exemplary embodiment of the present invention. Level measuring device 100 comprises collector 110, housing 170 and indicator devices 180. Generally, the collector is connected to the housing and the housing is connected to the indicator devices, though the means and devices adapted to form those connections will be discussed in more detail below.

Figure 4:
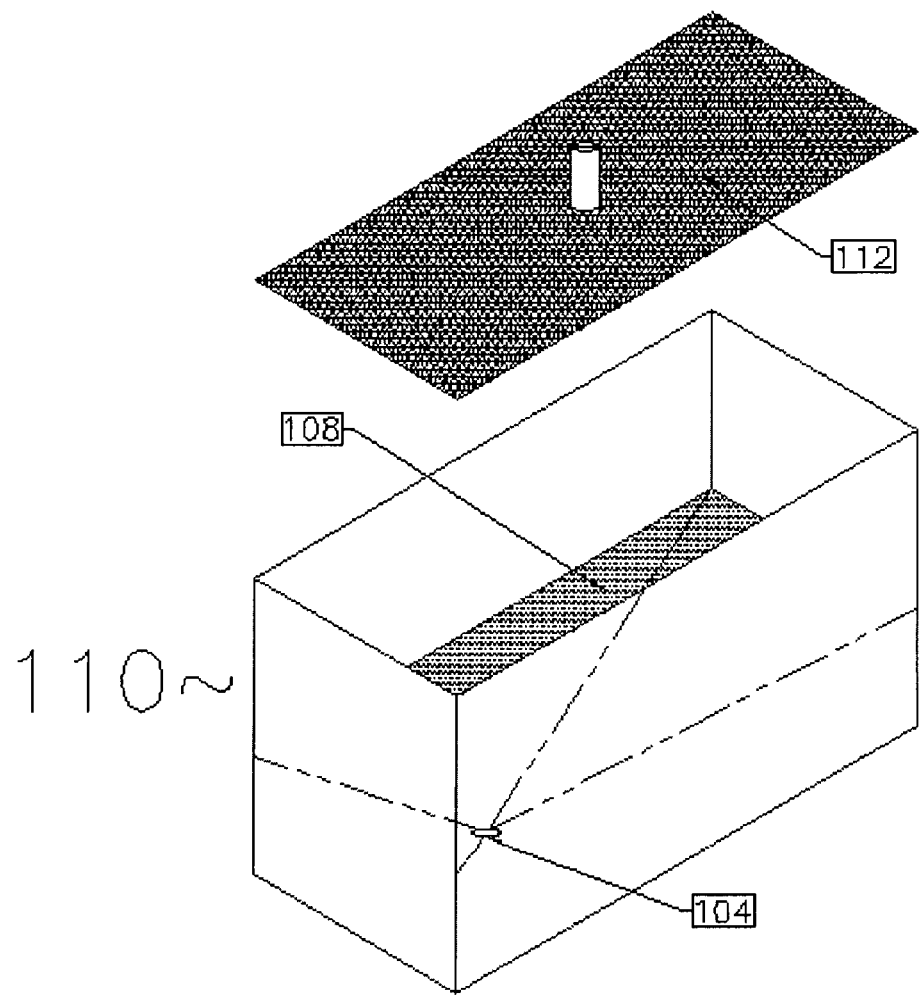
FIG. 4 is a drawing of the collector according to the first exemplary embodiment of the invention.

As shown in FIG. 4, collector 110 is a vessel generally adapted to receive any falling liquid, e.g., rainfall, etc. and includes a funnel-like bottom portion 108 with at least as many sidewalls of a depth necessary to make a container-like structure. Located at the bottom of collector 110, at the apex of the funnel-like portion 108, is a hole 104 for connection to housing 170. The hole 104 and the funnel-like portion may be centered, or as in the case of the exemplary embodiment, slightly off-center so as to minimize the distance between the collector 110 and the housing 170. The hole may also include threading to removably connect the collector 110 to the housing 170; however, threading is not necessary.

Preferably, collector 110 is a rectangular vessel with a screen 112 adapted to prevent large objects from entering the collector 110 positioned at either the top of the collector or inside the vessel portion. However, collector 110 might not have a screen, might be a conical funnel or any other such shape as could be calibrated to provide a mathematical relationship between the liquid in the collector and the liquid in the gauge (to be discussed in more detail below), collector 110 could even have a partial lid. Furthermore, collector 110 is constructed out of any material that would be robust in the collection of rain or other liquids. For example, collector 110 could be fabricated from aluminum, copper, stainless steel, or a strong synthetic material such as plastic for general usage, collector 110 might be made of a robust material such as a powdered metal in instances for applications where heavy rain could damage the collector, or collector 110 could be fabricated from polytetrafluoroethylene or similar, for use when measuring rain mixed with reactive chemicals, i.e. acid rain Referring back to FIG. 1 and as previously mentioned, the collector 110 is connected to the housing 170. Housing 170 includes a connecting tube 115, a measuring tube 120, and an electronic command unit 140. Connecting tube 115 is provided to removably connect the collector 110 and the measuring tube 120. As such, the connecting tube includes threads on both the distal and proximal ends so that the connecting tube may be screwed into place. However, one skilled in the art will appreciate that threading is not necessary on either the collector or the connecting tube 115, and connecting tube 115 could be permanently attached to one or both of the collector and the measuring tube via friction fit, adhesive or some other similar attachment means. Connecting tube 115 may be fabricated from the same types of material as used to fabricate the collector 110, but, it is not necessary for collector 110 and connecting tube 115 to be fabricated from exactly the same materials in the same device. One skilled in the art will also recognize that collecting tube 115 may not be entirely necessary, and accordingly some embodiments of the invention may connect the collector 110 directly to the measuring tube 120.

Connecting tube 115 connects the collector 110 to measuring tube 120. Measuring tube 120 includes a shell 119, long sensor electrode 172 and several level sensor electrodes 174 formed on a support member 130, and valve 150. Generally, shell 119 is a tube housing the liquid to be measured and the sensor electrodes 172 and 174. It is preferable that the shell 119 is transparent, insulating material i.e., fabricated from glass, transparent plastic, or the like, so that the sensor electrodes 172 and 174 can be easily viewed for error diagnostic purposes and the electrodes 172 and 174 are electrically isolated. However it is not necessary that the shell 119 be transparent or insulating (although shells fabricated from conductive materials require the addition of insulators for the invention to be operable) and shells fabricated from other materials are within the scope of this disclosure.

The long sensor electrode 172 and level sensor electrodes 174 are disposed on a support member 130 inside the shell 119. The long sensor electrode 172, disposed bisecting and down the length of the support member 130, provides a voltage which the incoming rain connects to the level sensor electrodes 174. The level sensor electrode 174, formed on alternating sides of and perpendicular to the long sensor electrode 172, each receive an electric potential through the water. Importantly, the sensor electrodes 174 are disposed according to the mathematical relationship between the area of the measuring tube 120 and the area of the planar surface 106 of the collector 110. Namely, the ratio of the area of the planar surface 106 to the area of the tube 120, multiplied by the desired measured increments, provides the spacing for the electrodes.

For example, where the ratio of the area of the planar surface 106 to the area of measuring tube 120 is 24/1, as in the exemplary embodiment of FIG. 1, then the level of liquid in the measuring tube 120 would be 24 times the level of liquid in the collector 110. Thus, for a desired measurement resolution of $1/100$ of an inch or 0.01 inches, the level sensor electrodes would be placed 0.24 inches apart, i.e., sensing electrode S1 is 0.24 inches vertically below sensing electrode S2. Sensing electrode S2 is 0.24 inches below S3, and so forth. Thus, one skilled in the art will recognize the various combinations for number of electrodes, measurement resolutions and collector areas that can be accommodated with the above formulae, without departing from the spirit and the scope of this disclosure.

Figure 5:
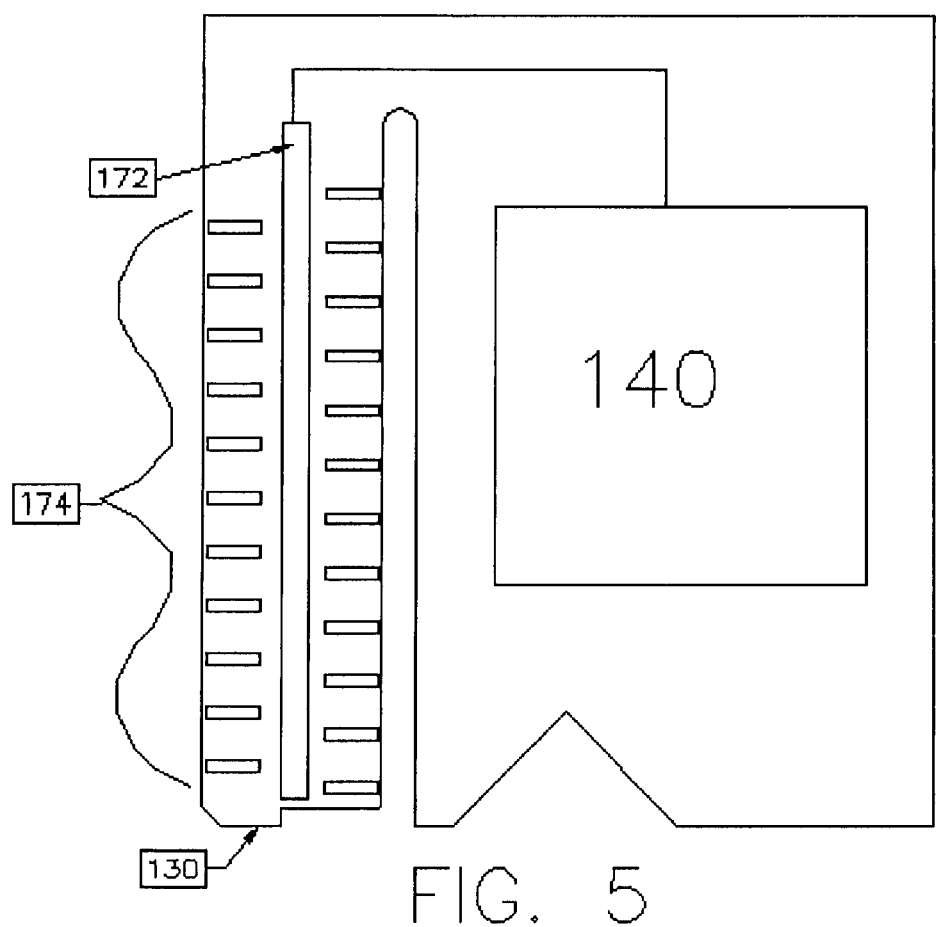
FIG. 5 is a drawing of the circuit board of the first embodiment of the invention.

Moreover, while there are multiple methods for fabricating the support member 130, the long sensor electrode 172 and the multiple level sensor electrodes 174, preferably, support member 130 is fashioned from an insulator, i.e., a circuit board, so that the long sensor electrode 172 and each of the level sensor electrodes 174 are electrically isolated. Sensor electrodes 172 and 174 and associated electrical connections to the electronic command unit 140 are thereby formed as wiring on the support member using standard printed circuit board techniques. It is further preferred, as shown in FIG. 5, that the same board used to mount the circuitry of the electronic command unit 140 is used as the support member 130, and that the connection from the sensor electrodes 172 and 174 be formed as traces thereon. This configuration allows for easy replacement of circuitry components and uniform installation. However, the support member 130 and board mounting the electronic command unit 140 could be formed as separate members so that measuring tube 120 may be immersed in a liquid or fluid. Electronic command unit 140 may be in also be in or covered with a liquid-tight insulator, e.g., potting compound that doesn't absorb moisture, to prevent damage to the electronic components of the electronic command unit 140. Moreover, one skilled in the art will recognize that there are many more alternatives and/or equivalent methods for mounting the sensor electrodes and providing wired connections between the sensor electrodes and the electronic command unit, all of which are incorporated herein.

Finally, the measuring tube 120 includes valve 150, which releases liquid from measuring tube 120. Valve 150 is preferably formed at the bottom of measuring tube 120. Valve 150 may be any commercially available valve that provides a tight seal to measuring tube 120, however, in preferred embodiments, valve 150 is a high-flow solenoid valve capable of coupling to the electronic command unit 140 and providing a quick, wide opening to allow for the rapid discharge of liquid.

Figure 2:
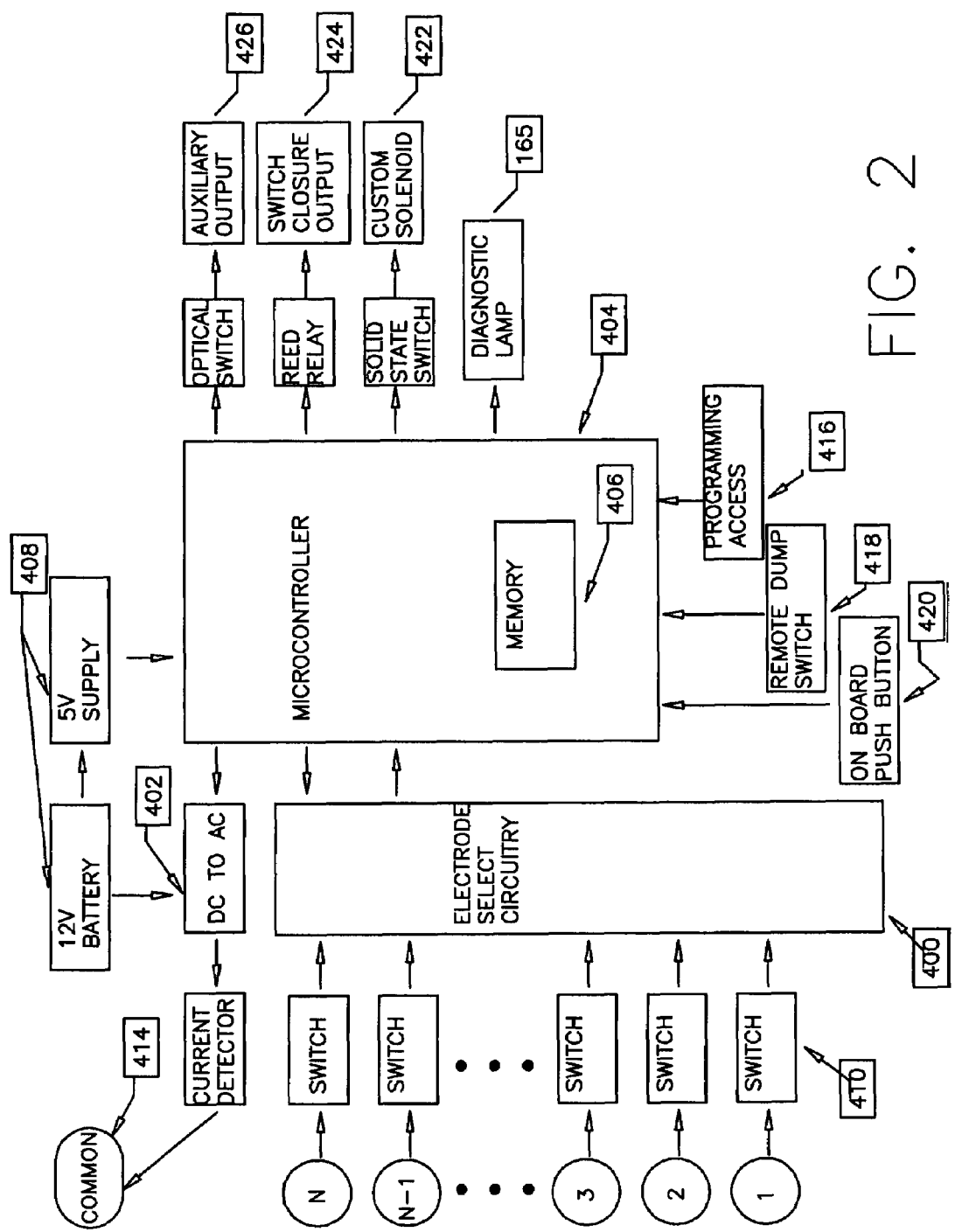
FIG. 2 is a flow diagram of the electronic control unit of the first exemplary embodiment of the invention.

As shown in FIG. 1, the measuring tube 120 is connected through the sensor electrodes 172 and 174 to the electronic command unit 140, which will now be described in detail with reference to FIG. 2. The electronic command unit includes a electrode select circuit 400, a DC/AC converter 402, a microcontroller 404 having a memory 406, power supply 408, switches 410, common electrode 414 programming access point 416, remote dump switch 418, on board push button 420, solenoid 422, switch output 424, and auxiliary output 426. Common electrode 414 is connected through a current detector to a DC/AC converter 42 and power supply 408. Together the current detector, DC/Ac converter 402 and power supply charge common electrode 414.

The microcontroller 404 forms "the brains" of the invention. The microcontroller 404 converts a digital signal indicative of the liquid level received from the current sensor when electrode select circuitry 400 draws current, into an output "count", or switch closure. Microcontroller 404 is connected to the DC/AC converter 402, power supply 408, access points 420, 418, and 416, custom solenoid 422, switch closure output 424, and auxiliary output 426. The microcontroller 404 couples to the DC/AC converter 402 to control the power delivered from the power supply 408 to the common electrode 414. Microcontroller 404 also connects to the electrode select circuitry 400 to both send a "polling" signal to each of the switches 410 and receive a signal from the current detector indicative of the water level in the measuring tube. Microcontroller 404 controls both the solenoid 422, which dumps the measuring tube, and an output terminal, which generates a switch closure to a remote location. The microcontroller 404 may also be coupled to an auxiliary output, in case data from the switches from the switches needs to be processed in another way, e.g. converted to a display, instead of just sending pulses to reflect proper functioning. Microcontroller 404 is also joined to several actuators 402, 418, and 416. On board push button 420 activates solenoid 422 through the microcontroller 404. Remote dump switch 418 is remotely connected to the solenoid through the receiver associated with remote dump switch 418 and programming access 416 allows a programmer to access microcontroller memory 406 to program the microcontroller 404.

While power supply 408 may continuously power the level measuring device, power supply 408 might also include a timer(not shown) The timer could have a "run" mode, a "sleep" mode and a "poll" mode. When there is no liquid in the collector 110, the timer shuts off the power supply 408, or enters "sleep" mode. After a certain time interval, the timer re-powers the circuitry of the device and goes into "poll" mode, i.e., powers on the system and checks the microcontroller 404 for a signal for a pre-determined time period. If a signal is received by the microcontroller 404, the microcontroller 404 sends a signal to the timer to switch to "run" mode. The timer then periodically checks the microcontroller 404 to see whether input data is being received by the microcontroller 404. If no data is being received by the microcontroller 404, the timer switches the circuitry of the device back to "sleep" mode. In this way, the timer enables the level measuring device to conserve power.

Although many variations exist for querying a plurality of sensing electrodes, and such variations are recognized as within the skill of a person of ordinary skill in the art with the benefit of this disclosure, the operation of the level measuring device according to an exemplary embodiment of the present invention will now be described with reference to FIG. 1 & 2. In its simplest form, rain is received by collector 110, and travels through the connecting tube 115 to the measuring tube 120. Simultaneously, the long sensing electrode receives power from power supply 408. If there is a liquid present in the measuring tube, current flows to a level sensing electrode 174. The microcontroller 404 polls the level sensing electrodes 174, $S_n$, n being equal to one of the plurality of level sensing electrodes formed on the support member 130, to determine the presence of water and then outputs a switch closure and increments n so that the system can poll the next electrode. Once the electronic command unit receives no voltage from the nth electrode, the microcontroller 404 holds the count for the first electrode not conducting, i.e. The value of (n) stored in memory for that electrode polled to conduct. Periodically, microcontroller 404 re-polls the electrodes to determine whether electrode n is conducting, and if so continues on to n+1. If the highest possible level sensing electrode in the measuring tube is evaluated as in the presence of liquid, the microcontroller also sends a signal to dump the contents of the measuring tube 120.

To compensate for rain passing through the measuring tube 120 during the activation of solenoid 422, the microcontroller calculates the missed rain based on the rainfall rate just prior to dumping, and accumulates fractional hundredths of an inch until that result exceeds $\frac{1}{100}$ inch of rain. Then an extra switch closure is emitted at 424 during dump. For example, let the error add up to 0.008 inches during one dump. If during the next dump an error of 0.005 inches is calculated, then the total rain missed would be 0.013 inches. The extra switch closure is sent, and the accumulated error is reduced to 0.003 inches to be included in the next dump's calculation. For predictability during manual dumps the accumulated error us zeroed out. This helps to check factory calibration and offers a clean start for those who empty the rainwater daily, thus avoiding complications from long term evaporation.

The operation of the rain gauge according to the invention will now be described in reference to FIGS. 3A and 3B. The microcontroller is initialized in step 600, i.e., turned on, and the scan position for the microcontroller is set at bottom level in step 602. In step 604, the microcontroller queries the power supply to ensure that the battery voltage is above a minimum voltage. If so, it sets an invalid scan position to lower power consumption in step 606. The microcontroller then sets an alarm flag to enable a double blinking light in step 612 and then requeries the battery voltage to see if it's below the minimum in step 620. As long as the battery voltage is below a minimum amount, the system returns to step 604, where the battery voltage was initially queried. If the battery voltage is determined to be above a minimum a mount again, the microcontroller checks to see if a manual or an external dump is requested in step 608, and if such a request has been made, the microcontroller resets the fractional pulses to zero in step 610, runs a dump cycle in steps 634, checks to make sure the dump is successful in step 638 and then sets the scan position to a bottom level in step 642, thereby returning once again to step 604. If the manual or external dump is not request in step 608, the scan position is queried too make sure that it's not the maximum level step 614. If the scan position is greater than the maximum level, the water in the measuring tube is checked to see if it's within maximum and minimum range in steps 616, the fractional pulses are incremented according to rainfall rate and dump time in 628, the system queries whether fractional pulses are greater than or equal to one in step 630. If so, the queued pulses are increment and the fractional pulses are decreased in steps 632, until the fractional pulses are less than one and a dump cycle can be run in step 634. If the scan position in step 614 is below a maximum level, then the microcontroller queries the scan position to see if it is conductive in step 618. The rainfall rate is calculated in step 624, and the scan position is conductive, the queued pulses are incremented in steps 622. The rainfall rate is calculated in step 624, and the scan position is advanced in step 626. The system then returns to steps 604 where the battery voltage is queried. If the scan position is not conductive in step 618, the battery voltage is re-queried in step 604, and the process begins again. It should be noted that after dump cycle 634, in step 638 the microcontroller queries the system to make sure that the dump was successful, and if the dump was not successful, sets an alarm flag in step 636 and waits to receive an external or manual dump. If an external or manual dump signal is received, the alarm flag is cleared in step 640 and the scan position is returned to a bottom level in step 642.

The dump cycle will now be described in greater detail with reference to FIG. 3B. In step 500, the drain valve is opened and an LED is activated. In step 502 the scan position is set to the dump position and in step 504 the microcontroller queries the system to see whether the dump attempts are less than the maximum dump attempts. If so, in step 506 the dump timer is set and in step 508 the microcontroller checks to see whether the timer is cleared. If not, the microcontroller ensures that the battery voltage is above the minimum in step 510 and in step 512 checks to see whether or not it is a first dump. If it is the first dump, the microcontroller checks to see whether or not it is conductive in step 514 and if so, the system returns to clearing the dump timer in step 508. If the scan position is not conductive the drain valve is closed and the LED is deactivated in step 516. In step 518 the post-dump delay timer is set and the system waits for it to expire. In step 520, the microcontroller checks to see whether or not the current scan position is conductive, and if not, sets a scan position to the bottom level in step 522 and in step 530 it signals that there was a successful dump and returns to the main loop. If the current level is conductive in step 520, then the dump attempt counter is incremented(532) and then the drain valve is open is step 534. The system returns to checking whether the dump attempts are greater than the maximum dump attempts in step 504. If the dump attempts are greater than the maximum dump attempts in step 504, an alarm flag is set to double blink(524), in step 526 the scan position is set to invalid to lower the power consumption in step 526 and in step 528 there is a failure indicated and the program returns to the main loop.

The above description is of the general features of device 100, however there are many other additions to the devices that one skilled in the art could incorporate into the exemplary embodiments. For example, an embodiment could employ a six inch plastic tube that measures a liquid column of fluid with the described herein 0.24 inch spacing between level sensing electrodes. The collector would therefore have an opening 24 times the measuring tube circumference, and each increment between the level sensing electrodes would represent $1/100$ of an inch of rain. The next to highest electrode would cause the solenoid valve to dump, and the next 6 inch column of water would be measured. The circuitry to perform these operations would be a 12 volt battery with a five volt regulator supplying power to the microcontroller. An oscillator would generate a 600 HZ AC voltage and the AC voltage would be transformed from 5 volts to 120 volts rail to rail. The microcontroller would scan the electrodes, i.e., one at a time and look for a change between liquid conduction and open circuit. At the next to last electrode, the microcontroller would signal the solenoid to send a dump signal and the measuring would start again at the next successive number in the electrode count. An embodiment implemented as described has an accuracy of approximately 1%.

One skilled in the art will appreciate the advantages of the instant invention including, but not limited to, low maintenance operation (routine debris removal is all that is needed), ability of the unit to communicate with remote terminals, digital measurement capabilities, no required calibration of the sensors, individual sensing points may be internally hard-wired and may be fully encapsulated between a stainless steal backing and an ABS front strip, a special circuit may be added to reduce possible damage by lightning or system transients, all construction materials may be compatible with hazardous environments in outdoor applications, low cost construction, and temperature changes down to just above freezing do not affect the sensor's accuracy.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A rain gauge device comprising:
   a collector adapted to collect a fluid;
   a measuring tube in communication with the collector, said measuring tube adapted to receive the fluid;
   a plurality of conductivity sensors, said plurality of conductivity sensors being disposed in said measuring tube and each conductivity sensor comprising at least two selectable electrodes receiving a voltage and an output electrode; and an electronic command unit adapted to apply said voltage across said at least two selectable electrodes and receive a signal from said output electrode.

2. The rain gauge device of claim 1, wherein the plurality of conductivity sensors are fixed to a support member and wherein the support member is disposed in the measuring tube.

3. The rain gauge device of claim 1, wherein the collector has a planar surface, said planar surface having an area larger than an area of a planar surface of said measuring tube.

4. The rain gauge device of claim 3, wherein the planar surface area of said collector is at least 2 times the planar surface area of said measuring tube.

5. The rain gauge device of claim 3, wherein the planar surface area of said collector is at least 24 times the planar surface area of said measuring tube.

6. The rain gauge device of claim 1, further comprising a valve connected to said measuring tube, said valve adapted to discharge liquid accumulated in the measuring tube.

7. The rain gauge device of claim 6, wherein the valve is a solenoid valve and wherein said electronic command unit is in communication with the solenoid valve.

8. The rain gauge device of claim 7, wherein said electronic command unit can include a transceiver adapted to receive from and transmit information to a remote control station.

9. The rain gauge device of claim 8, further comprising a display for displaying rain gauges.

10. The rain gauge device of claim 9, wherein said display is remotely connected by said transceiver to said rain gauge device.

11. The rain gauge device of claim 6, further comprising a housing in which the electronic command unit is disposed.

12. The rain gauge device of claim 1, wherein said electronic command unit comprises a microcontroller and said microcontroller is adapted to convert the signal from said output electrode to a measurement of the fluid in said collector.

13. The rain gauge device of claim 1, wherein the electronic command unit further comprises a power supply, and said power supply is adapted to successively apply a voltage across said at least two selectable electrodes.

14. The rain gauge device of claim 13, wherein the voltage applied to said at least two selectable electrodes is AC.

15. A method of calculating the measurement of fluid in a vessel comprising the steps of:

receiving said fluid in the vessel;

transferring said liquid from the vessel to a measuring device, said measuring device having a common electrode and output electrode;

applying a voltage from the common electrode through the water to a selected output electrode, chosen among the output electrodes;

conducting a current as directed by a microcontroller through the selected output electrode if said fluid is between the common electrode and the selected electrode;

calculating the level of said fluid in said vessel using a ratio of an area of said vessel to an area of said measuring device and the current received from the selected output electrode; and outputting said level increment wherein, said current conducted to said microcontroller indicates the output electrodes that conducted, said output electrodes being placed in the measuring device in known positions.

* * * * *